United States Patent Office 3,014,061
Patented Dec. 19, 1961

3,014,061
COMPLEX BORON ESTERS
Glenn E. Irish, Detroit, James B. Hinkamp, Birmingham, and John D. Bartleson, Franklin, Mich., assignors to Ethyl Corporation, New York, N.Y., a corporation of Delaware
No Drawing. Filed Aug. 22, 1956, Ser. No. 605,486
4 Claims. (Cl. 260—462)

This invention relates to new compositions of matter, more particularly to new boron-containing reaction products.

Various boron compounds have been proposed as fuel or oil additives. These have suffered from the disadvantages that their effectiveness was slight, that they were unstable under use conditions, that they were limited in utility to only one or a few types of hydrocarbons, that they were difficult to prepare, etc. The petroleum industry would greatly benefit by provision of boron compounds which are highly effective in improving a wide range of hydrocarbon types and which are stable under use conditions.

An object of this invention is to provide new compositions of matter. A further object is to provide stable boron-containing reaction products. Another object is to provide new compositions of matter which have high effectiveness in improving the characteristics of liquid hydrocarbons. Still another object is to provide new processes for preparing these boron-containing reaction products. An additional object is to provide new compositions of matter which comprise liquid hydrocarbons, particularly mineral oils, containing the boron-containing products of this invention. Other objects of this invention will be apparent from the ensuing description.

In accordance with the present invention, new compositions of matter are provided which consist of the boron-containing product obtained by reaction between (1) a dinuclear phenolic compound having, ortho to a phenolic hydroxyl group, at least one hydrocarbon substituent which is branched on its alpha carbon atom—i.e., branched on the carbon atom which is attached to the phenolic ring—and (2) a completely esterified oxy acid of boron, each ester group of said esterified oxy acid being discrete—i.e., attached to the molecule at one point only—and at least one of said groups being a monovalent, non-aromatic hydrocarbon ester group which contains no more than about 6 carbon atoms; there being from about 0.3 to about 3 moles of said compound per gram atom of boron as said completely esterified oxy acid of boron. These boron-containing products are readily obtained by reacting the above phenolic compounds with the above esters of an oxy acid of boron at a temperature from about 60 to about 220° C.

By a dinuclear phenolic compound is meant a compound which possesses two aromatic nuclei, each of which contains at least one hydroxyl group directly attached thereto. Thus, the dinuclear phenolic compound used in forming the boron-containing products of this invention possesses two distinct phenolic moieties and has at least one hydrocarbon substituent which is branched on its alpha carbon atom and positioned ortho to a phenolic hydroxyl group.

The boron-containing products of this invention are, for the most part, white or yellowish semi-solids which are soluble in most common organic solvents. These products are apparently very complex in chemical structure, because when subjected to elemental chemical analyses, they do not correspond to any readily depictable chemical formula.

The novel boron-containing reaction products of this invention possess a number of outstanding advantages. In the first place, they very effectively improve the performance characteristics of a wide variety of liquid hydrocarbons when dissolved therein—i.e., when used as additives in liquid hydrocarbons. Secondly, these products are readily prepared in good yield from starting materials, many of which materials are available as articles of commerce. Thirdly, these products possess high solubility in most liquid hydrocarbons, especially petroleum hydrocarbon oils. In fact, the products of this invention have a higher hydrocarbon solubility than many of the dinuclear phenolic compounds from which they are made. Therefore, these products are more easily blended with liquid hydrocarbons, can be used at higher concentrations and no solubility problems occur when liquid hydrocarbons containing these products are stored at low temperatures for long periods of time. Furthermore, the products of this invention possess unusual resistance against hydrolysis and thus can be effectively used as additives for hydrocarbons which come in contact with or contain water. Moreover, the products of this invention are very stab'e at elevated temperatures, such as are encountered in operating gasoline engines. Thus, when used as mineral oil additives for crankcase lubricants and the like, no appreciable deterioration of the products occurs during engine service.

Another part of this invention is the process of preparing boron-containing products which comprises reacting (1) a dinuclear phenolic compound having, ortho to a phenolic hydroxyl group, at least one hydrocarbon substituent which is branched on its alpha carbon atom with (2) a completely esterified oxy acid of boron, each ester group of said esterified oxy acid being discrete and at least one of said groups being a monovalent, non-aromatic hydrocarbon ester group which contains no more than about 6 carbon atoms; there being used in this reaction from about 0.3 to about 3 moles of said compound per gram atom of boron as said completely esterified oxy acid of boron. As pointed out above, this reaction readily takes place by bringing together the above reactants in the proportions specified and heating the resu'tant mixture to a temperature between about 60 and about 220° C. In this reaction there is liberated the alcohol from which the boron ester was at least in part prepared. In other words, since the boron ester contains at least one monovalent, non-aromatic hydrocarbon ester group which contains no more than about 6 carbon atoms, this ester group is released during the reaction as the corresponding alcohol. It thus appears that the process of this invention results, at least in part, from an ester interchange between the dinuclear phenolic compound and the boron ester. Since the products of this invention are complex, it is likely that additional chemical transformations occur during this process. However, experiments have shown that except for the alcohol released from the boron ester, no other by-product is produced. Hence, completion of the process of this invention is clearly evidenced by cessation of the evolution of the monohydric alcohol (containing less than 7 carbon atoms) from which the boron ester had been at least in part prepared.

The process of this invention can be conducted in the absence of a solvent. In this case there is evolved one or more alcohols containing no more than about 6 carbon atoms, these resulting from the interchange between the dinuclear phenolic compound and the ester group or groups containing no more than about 6 carbon atoms originally present in the boron ester.

In carrying out the present process, it is preferable to employ an inert solvent to assist in the liberation of the above alcohol. Such inert solvent should boil between 80 and 200° C. and preferably between 100 and 170° C. Suitable solvents for this purpose include aromatic hydrocarbons, such as benzene, toluene, xylene, pseudocumene; aromatic fractions boiling within the reaction temperature ranges above specified or the like; aliphatic hydrocarbons, such as n-octane, decanes, etc.; inert chlorinated hydrocarbons, such as carbon tetrachloride, chloroform, triclene, etc.; and the like.

Any dinuclear phenolic compound, as above described, can be used in preparing the novel and eminently useful boron-containing products of this invention. However, it is preferable to use dinuclear phenolic compounds represented by the following general formula

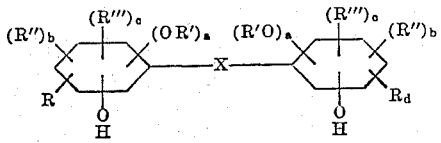

wherein R is selected from the group consisting of secondary alkyl radicals containing from 3 to 12 carbon atoms, tertiary alkyl radicals containing from 4 to 12 carbon atoms, cycloalkyl radicals containing from 5 to 12 carbon atoms and aralkyl radicals that are branched at the point of attachment to the phenolic nucleus and that contain 8 to 12 carbon atoms; R' is selected from the group consisting of hydrogen and alkyl radicals containing from 1 to 8 carbon atoms; R'' and R''' are selected from the group consisting of alkyl, cycloalkyl, phenylalkyl, phenyl and alkylphenyl, R'' and R''' each containing no more than about 18 carbon atoms; X is selected from the group consisting of a single chemical bond directly connecting the phenolic nuclei and a divalent hydrocarbon radical containing from 1 to 34 carbon atoms, and $a$, $b$, $c$, and $d$ are integers from 0 to 1; R being positioned on the phenolic nucleus ortho to the hydroxyl group. From the standpoint of availablility and ease of manufacture, it is desirable that the divalent hydrocarbon radical depicted above as X contain no more than 14 carbon atoms in a chain separating the phenolic nuclei. It is also particularly desirable that there be at least one branched chain substituent (see R above) ortho to each hydroxyl group of the dinuclear phenolic compound.

Particularly preferred dinuclear phenolic compounds are symmetrical dinuclear phenolic compounds of the general formula appearing above. Such compounds result in the formation of boron-containing reaction products of unusually great hydrolysis resistance.

The boron esters used in preparing the boron-containing products of this invention can be prepared or derived from any oxy acid of boron, including orthoboric acid ($H_3BO_3$), metaboric acid ($HBO_2$), pyroboric acid ($H_4B_2O_5$ sometimes referred to as mesoboric acid), the biboric acids (($HO)_2BOROB(OH)_2$, where R is an alkylene radical), the various polyboric acids, boronic acid ($H_3BO_2$), borinic acid ($H_3BO$), etc. The chief requirement for these esters is that they contain at least one monovalent, non-aromatic hydrocarbon ester group which contains no more than about 6 carbon atoms. Thus, the esters derived from these acids result from esterification of the acid with any monohydric alcohol, monohydric phenol or mixture of such alcohols and/or phenols, at least one of these alcohols containing no more than about 6 carbon atoms. It is desirable that the boron ester contain a total of no more than about 40 carbon atoms.

The boron esters preferably contain at least one monovalent saturated hydrocarbon ester group containing no more than about 6 carbon atoms which is an alkyl or cycloalkyl group, because the corresponding alcohol is readily liberated at the temperatures at which the process of this invention is carried out. However, any boron ester as above defined can be used which contains the requisite ester group or groups of less than 6 carbon atoms, provided such group or groups forms an alcohol that boils in the range of 60 to 220° C. or forms an azeotrope with the solvent used, which azeotrope boils within this temperature range. In fact, the above ester group or groups of less than 6 carbon atoms can be substituted non-aromatic hydrocarbon radicals so long as the corresponding alcohol boils or forms an azeotrope which boils in this temperature range. 2-methoxyethyl, 2-butoxyethyl and furyl are examples of such substituted radicals, these forming respectively 2-methoxy ethanol (B.P. 124° C.), 2-butoxy ethanol (B.P. 171° C.) and furfuryl alcohol (B.P. 170° C.).

Symmetrical boron esters—i.e., boron esters in which all of the requisite ester groups are the same and contain no more than about 6 carbon atoms—are preferred. These symmetrical esters react more readily than asymmetrical boron esters, are inexpensive and are readily available either through relatively simple preparative procedures or as articles of commerce.

Particularly preferred boron esters for preparing the products of this invention are boron esters which are normally susceptible to hydrolysis. Such esters enter into the process of this invention very readily, probably because of their reactivity. Thus, in preparing the boron-containing products of this invention, it is preferable to use a boron ester which would be hydrolyzed when placed in contact with water at 25° C. within two hours.

Another embodiment of this invention is liquid hydrocarbons, especially mineral oils, containing a small amount—about 0.003 to about 10 percent by weight—of the present boron-containing reaction products. Substantial improvements in the performance characteristics of the hydrocarbons are achieved.

Among the liquid hydrocarbons which are improved in accordance with this invention are included hydrocarbon mixtures of the types which are normally used as fuels, as lubricating agents, and as intermediates for the preparation and production of the same. Benefits are therefore obtained by blending with gasoline, jet fuel, fuel oil, crude petroleum and the like the boron-containing products of this invention. Pure hydrocarbons are also benefited by dissolving therein the new boron-containing products of this invention, particularly with regard to their combustion properties. Examples of such hydrocarbons include benzene, toluene, n-octane, isoheptane, and, in general, pure aliphatic, cycloaliphatic, naphthenic and aromatic liquid hydrocarbons. In the hydrocarbons which are used as fuels, this invention imparts improved combustion properties thereto. In the case of the liquid hydrocarbons which are used as lubricating agents, this invention imparts improved thermal stability and oxidation resistance thereto. When used in the treatment of petroleum crudes and intermediate fractions, the boron-containing products of this invention impart easier processing characteristics thereto and, in addition, ordinarily result in improved characteristics of the finished petroleum products obtained therefrom.

The boron-containing products of this invention and the processes for their preparation will be further apparent from the following specific examples in which all parts and percentages are by weight.

EXAMPLE 1

To a solution of 28.5 parts of isopropyl metaborate trimer (0.25 gram atom of boron) dissolved in 120 parts of toluene was added 106 parts of 1,1-bis-(3,5-di-tert-butyl-4-hydroxyphenyl) methane (0.25 mole) dissolved in 160 parts of toluene. The resulting solution was heated to 113–115° C. with stirring. The isopropanol-toluene azeotrope was removed from the reaction system leaving the reaction product between the phenolic compound and isopropyl metaborate dissolved, for the most part, in the remaining toluene. This product was recovered by evaporating the toluene, extracting the residue with petroleum ether and evaporating the petroleum ether from the product. The product was a yellow granular solid melting at 120° C. It contained 1.1 percent of boron.

EXAMPLE 2

To 395 parts of hexyl metaborate trimer (3 gram atoms of boron) dissolved in 1000 parts of pseudocumene is added 1020 parts (3 moles) of 1,1-bis-(2-hydroxy-3-tert-butyl-5-methylphenyl) methane. This mixture is heated to a reflux temperature of 170° C. for 10 hours. At the end of this time, the evolution of hexyl alcohol has ceased. The reaction product between 1,1-bis(2-hydroxy-3-tert-butyl-5-methylphenyl) methane and hexyl metaborate is recovered from the resulting pseudocumene slurry by evaporating off the pseudocumene at 100° C. at a pressure of 2 mm. of mercury.

EXAMPLE 3

Using 1000 parts of n-octane as reaction solvent, 1272 parts (3 moles) of 1,1-bis-(3,5-di-tert-butyl-4-hydroxyphenyl) phenylmethane and 347.5 parts (3 gram atoms of boron) of 2-ethoxy-ethyl metaborate trimer are reacted at a temperature of 120° C. 2-ethoxyethanol is liberated and the product between 1,1-bis-(3,5-di-tert-butyl-4-hydroxyphenyl) phenylmethane and 2-ethoxyethyl metaborate remains partially dissolved in the n-octane.

EXAMPLE 4

324 parts (1 mole) of 3,3'-di(1-ethylallyl)-4,4'-di-hydroxydiphenyl prepared as described in U.S. Patent 2,229,010 is added to a solution of 225.5 parts (1.2 gram atoms of boron) of triisopropyl orthoborate in 400 parts of benzene. The mixture is then heated to 80° C. and isopropanol is evolved. The boron-containing product between 3,3'-di(1-ethylallyl)-4,4'-dihydroxydiphenyl and triisopropyl orthoborate remains partially dissolved in the benzene.

EXAMPLE 5

In 750 parts of pseudocumene heated to 170° C. are reacted 578 parts (1 mole) of 1,10-di-(3-sec-amyl-2-hydroxyphenyl) octadecane (prepared according to U.S. Patent 2,321,620) and 314 parts (1 gram atom of boron) of tri-n-hexyl orthoborate. n-Hexanol is liberated yielding a boron-containing reaction product between 1,10-di-(3-sec-amyl-2-hydroxyphenyl) octadecane and tri-n-hexyl orthoborate.

EXAMPLE 6

With 500 parts of mixed xylenes is mixed 460 parts (1 mole) of a mixture of 2,2'-bis-(3-(1-phenyl-1-ethyl)-4-hydroxyphenyl) propane; 2-(3,5-di-(1-phenyl-1-ethyl)-4-hydroxyphenyl)-2'-(3'-(1-phenyl - 1 - ethyl)-4-hydroxyphenyl) propane, and 2,2'-bis-(3,5-di(1-phenyl-1-ethyl)-(4-hydroxyphenyl) propane prepared according to U.S. Patent 2,636,905. To this mixture is added 178 parts (1 gram atom of boron) of diethyl phenylboronate. This mixture is then heated to 140° C. with the liberation of ethanol. The boron-containing reaction product of the aforesaid reactants remains partially dissolved in the mixed xylenes.

EXAMPLE 7

The following ingredients are mixed: 312 parts (1 mole) of 4,4'-isopropylidene-di-(2-isopropyl phenol) prepared according to U.S. Patent 2,535,015; 268 parts (1 gram atom of boron) of n-butyl di-p-tolylborinate, and 350 parts of m-xylene. This is heated to 140° C. and butanol is evolved. The boron-containing reaction product of the foregoing phenolic compound and borinate is formed.

EXAMPLE 8

At 170° C. 718 parts (1 mole) of 3,5,5'-tridodecyl-3'-ethyl-4,4'-dihydroxydiphenyl, described in U.S. Patent 2,479,948, is reacted with 226 parts (1 gram atom of boron) of tetra-n-hexyl pyroborate using 1000 parts of mixed pseudocumene as solvent. Hexanol is liberated and the boron-containing reaction product of these reactants is formed.

EXAMPLE 9

At 150° C. and using 200 parts of an aromatic-rich petroleum fraction distilling from 150 to 190° C. as reaction solvent, 205 parts (0.5 mole) of 3,3',5,5'-tetra-tert-butyl-4,4'-dihydroxyphenyl and 57.8 parts (1 gram atom of boron) of methyl metaborate trimer are reacted. Methanol is evolved and the boron-containing reaction product of the phenolic compound and the metaborate is formed.

EXAMPLE 10

1000 parts (2.5 moles) of 2,2-bis-(2-hydroxy-3-tert-butyl-5-methoxyphenyl) propane, prepared according to U.S. Patent 2,591,651 and 83.7 parts (1 gram atom of boron) of n-butyl polyborate are heated to 150° C. using an aromatic petroleum fraction boiling at this temperature as reaction solvent. n-Butanol is liberated and the boron-containing reaction product between the phenolic compound and the polyborate is formed.

EXAMPLE 11

To a solution of 28.5 parts of isopropyl metaborate trimer (0.25 gram atom of boron) dissolved in 160 parts of xylene was added 53 parts of 1,1-bis-4-hydroxy-3,5-di-tert-butylphenyl) methane (0.125 mole) dissolved in 100 parts of xylene. The solution was heated to 145° C. with the evolution of isopropanol. In the reaction vessel remained a bright-yellow gel which was insoluble in the xylene. This gel, the reaction product between the above phenolic compound and the isopropyl metaborate, was converted to a flocculent white precipitate upon contacting the same with petroleum ether.

EXAMPLE 12

525 parts (1.5 moles) of 3,3'-di-cyclohexyl-4,4'-di-hydroxydiphenyl (see U.S. Patent 2,285,563) is reacted with 100 parts (1 gram atom of boron) of n-butyl metaborate. The solvent is toluene and the reaction temperature 110° C. The boron-containing reaction product of these reactants is formed and n-butanol is evolved in the process.

EXAMPLE 13

The following ingredients are mixed and heated to 80° C.: 988 parts (2 moles) of 2,15-di-(4-isopropyl-3-hydroxyphenyl) hexadecane (see U.S. Patent 2,321,620), 156 parts (1 gram atom of boron) of methyl di-n-butylborinate and 1000 parts of benzene. With the evolution of methanol, there is formed the boron-containing reaction product between the phenolic compound and the borinate.

EXAMPLE 14

Reaction is caused between 342 parts (1.5 moles) of 3-isopropyl-4,4'-dihydroxydiphenyl and 342 parts (1 gram atom of boron) of dibutyl dodecyl orthoborate in 500 parts of toluene by heating this mixture to 110° C. n-Butanol is evolved and the boron-containing reaction product is formed.

EXAMPLE 15

With 1000 parts of mesitylene as solvent, 1080 parts (3 moles) of 4,4'-benzylidene-di-(2-isopropylphenol) (see U.S. Patent 2,542,688) are reacted with 85.8 parts (1 gram atom of boron) of isopropyl metaborate. The reaction temperature is 165° C. The boron-containing reaction product is formed and partially soluble in the solvent.

The products of this invention are hydrolytically stable. Hydrolytic stability is measured by placing a sample of a product of this invention in contact with about its own volume of water at room temperature for 24 hours. If substantially no hydrolysis of the product occurs in 24 hours, it is said to be hydrolytically stable. This property is of extreme importance since it means that the products of the invention can be used with petroleum hydrocarbon mixture without the necessity of drying the hydrocarbon prior to the treatment.

The amount of boron-containing products of this invention to be added to the hydrocarbon can be varied over a wide range and still give great effectiveness. Generally speaking, concentrations from about 0.003 to about 10 percent by weight are very satisfactory. In the lighter hydrocarbons of this invention, such as pure hydrocarbons, gasoline, jet fuel and the like, the amount of product chosen is generally such that the resulting composition contains from 0.001 to 1.5 grams of boron per gallon as the product of this invention. In heavier hydrocarbons, such as lube oil, the amount of product is preferably chosen so as to provide 0.001 to 0.1 percent of boron.

The following examples illustrate typical hydrocarbons of this invention.

EXAMPLE 16

To 100,000 parts of gasoline composed of 45.2 volume percent paraffins, 28.4 volume percent olefins and 25.4 volume percent aromatics and containing 3.0 milliliters of tetraethyllead per gallon, along with 1.0 theory of ethylene dichloride and 0.5 theory of ethylene dibromide (one theory being the amount necessary to react completely with the lead to form lead dihalide) is added 400 parts of the product of Example 1. The resultant gasoline is found to have a lower surface ignition rate than previously.

EXAMPLE 17

To 100,000 parts of JP-5 jet fuel is added 400 parts of the product of Example 2. After mixing the resulting jet fuel composition possesses enhanced thermal stability and combustion properties.

EXAMPLE 18

To 3000 parts of a phenol-treated, mixed-based hydrocarbon oil having a viscosity of 53.4 Saybolt Universal Seconds at 210° F. and a viscosity index of 103 is added 150 parts of the product of Example 11. After mixing the resulting lubricating oil composition possesses enhanced stability and oxidation resistance characteristics.

EXAMPLE 19

To 100,000 parts of toluene is added 700 parts of the product of Example 3. The resulting blend possesses enhanced combustion properties.

EXAMPLE 20

With 100,000 parts of a hydrocarbon diesel fuel having a cetane number of 51.7, an API gravity of 37.0, a heat content of 19,620 B.t.u. per pound, and a 50 percent boiling point of 509° F. is blended 800 parts of the product of Example 9. The resulting blend possesses superior combustion properties, particularly with regard to smoking tendencies.

EXAMPLE 21

Into 50,000 parts of liquefied petroleum gas consisting chiefly of propane and butane is metered 200 parts of the product of Example 7. The resulting blend possesses superior combustion properties.

EXAMPLE 22

With 100,000 parts of cracked unleaded gasoline is added 700 parts of the product of Example 6. The resulting gasoline blend possesses superior combustion properties, enhanced oxidation resistance and superior susceptibility toward addition of tetraethyllead.

EXAMPLE 23

To individual portions of six typical petroleum hydrocarbon lubricating oils, each portion being 3000 parts, is added respectively 150 parts of the boron-containing products of Examples 2, 3, 4, 9, 11 and 15. The properties of these oils are shown in Table I.

Table I.—Properties of representative petroleum hydrocarbon oils

| Oil | A | B | C | D | E | F |
|---|---|---|---|---|---|---|
| Gravity at 60° API | 30.3 | 30.5 | 28.8 | 21.1 | 20.5 | 31.0 |
| Viscosity, Saybolt: | | | | | | |
| Seconds at 100° F | 178.8 | 373.8 | 309.8 | 169.0 | 249.4 | 335.4 |
| Seconds at 210° F | 52.0 | 58.4 | 63.8 | 51.5 | 45.7 | 68.4 |
| Viscosity Index | 154.2 | 107.4 | 141.9 | 157.8 | 35.8 | 144.4 |
| Pour point | −30 | +10 | −20 | −15 | | 0 |
| Flash point | 410 | 465 | | | 365 | 385 |
| Sulfur, percent | 0.2 | 0.3 | 0.3 | 0.3 | 0.3 | 0.1 |

After mixing the resulting oils all possess enhanced resistance against oxidative deterioration.

To demonstrate the outstanding ability of the boron-containing products of this invention in markedly improving the oxidative resistance of mineral oils, tests were conducted using the Polyveriform test apparatus. The Polyveriform Oxidation Stability Test is described in the paper entitled, "Factor Causing Lubricating Oil Deterioration in Engines," Ind. and Eng. Chem., Anal. Ed., 17, 302 (1945). See also "A Bearing Corrosion Test for Lubricating Oils and Its Correlation with Engine Performance," Anal. Chem., 21, 737 (1949). This test effectively evaluates the performance of petroleum hydrocarbon oil antioxidants. The test equipment and procedure employed and correlation of the results with engine performance are discussed in the first paper above cited.

In these tests the base oil used was an initially additive-free, 95 V.I. solvent-refined SAE 10 petroleum hydrocarbon crankcase lubricating oil. Oxidative deterioration of the oil was promoted by employing as an oxidation catalyst 0.05 percent by weight of the ferric oxide (added as ferric 2-ethyl hexoate). It has been found by experiment that under the drastic conditions of elevated temperature and the presence in the oil of ferric oxide, mineral oils are very rapidly deteriorated.

In the present tests, the principal test conditions consisted of passing 70 liters of air per hour through the test oil for a total period of 20 hours while maintaining the oil at 300° F. One such test was carried out using the additive-free base oil and another using the same oil to which had been added 4.5 percent of the boron-containing product prepared according to Example 1. This improved lubricant of this invention thus contained 0.05 percent by weight of boron as a typical boron-containing product of this invention. The results of these tests are shown in Table II.

Table II.—Effect of additives on oxidation of petroleum hydrocarbon oil

| Test No. | Additive | Acid No. | Percent Viscosity Increase, SUS at 100° F. |
|---|---|---|---|
| 1 | None | 8.07 | 114 |
| 2 | Reaction product between 1,1-bis-(3,5-di-tert-butyl-4-hydroxyphenyl) methane and isopropyl metaborate. | 1.12 | 22 |

Referring to the data in Table II, it will be seen that the additive-free, base oil was markedly deteriorated during the drastic test conditions as shown by the substantial increase in acid number and percent viscosity. On the other hand, the typical lubricant of this invention possessed striking resistance against oxidative deterioration as shown by the results of test 2. Equally good results are achieved from other lubricating oil compositions of this invention.

Typical esters of oxy acids of boron useful in the preparation of the boron-containing reaction products of this invention include tetraisopropyl pyroborate; tetra-(2-amyl) pyroborate; tolyl-tributyl pyroborate; tetra-(cyclohexyl) pyroborate; cyclohexyl tetraborate; methyl dimethylborinate; propyl di-sec-butylborinate; ethyl dibenzylborinate; methylethyl methylboronate; dihexyl butylboronate; dibutyl phenylboronate; dimethyl phenylboronate; trimethyl orthoborate; tributyl orthoborate; trihexyl orthoborate; methyl-di-(phenyl) orthoborate; butyl dimethyl orthoborate; tri-(cyclohexyl) orthoborate; tri-(β-ethoxyethyl) orthoborate; tri-(furyl) orthoborate; tri-(allyl) orthoborate; methyl metaborate; propyl metaborate; isopropyl metaborate; n-butyl metaborate; hexyl metaborate; cyclohexyl metaborate; β-ethoxyethyl metaborate; and the like. Thus, the most important classes of boron esters are alkyl orthoborates; alkoxyalkyl orthoborates; cycloalkyl orthoborates; alkyl pyroborates; alkoxyalkyl pyroborates; cycloalkyl pyroborates; alkyl polyborates; alkoxyalkyl polyborates; cycloalkyl polyborates; dialkyl alkylboronates; dicycloalkyl alkylboronates; dialkyl arylboronates; dicycloalkyl arylboronates; dialkyl cycloalkylboronates; dicycloalkyl cycloalkylboronates; alkyl dialkylborinates; cycloalkyl dialkylborinates; alkyl diarylborinates; cycloalkyl diarylborinates; alkyl dicycloakylborinates; cycoakyl dicycloalkylborinates; alkyl metaborates; alkoxyalkyl metaborates; cycloalkyl metaborates, and the like. Such esters preferably contain no more than about 40 carbon atoms in the molecule, and as pointed out above, contain at least one non-aromatic ester group having no more than 6 carbon atoms. The foregoing boron esters are best prepared by esterifying the appropriate acid of boron with sufficient monohydric alcohol or alcohol and phenol to form the desired ester. The methods for the preparation of the boron acids themselves are well known and frequently involve dehydration of orthoboric acid as in the preparation of pyroboric acid and metaboric acid.

To further describe the more important types of boron esters useful in this invention, the following general formulas are presented:

(1) 

wherein $R_1$, $R_2$ and $R_3$ are selected from the group consisting of alkyl, cycloalkyl, aralkyl, aryl and alkaryl radicals at least one of $R_1$ and $R_2$ being non-aromatic and containing no more than 6 carbon atoms.

(2) 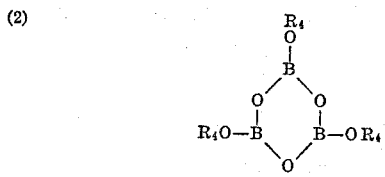

wherein $R_4$ is an alkyl, alkoxyalkyl or cycloalkyl group containing no more than 6 carbon atoms.

(3) 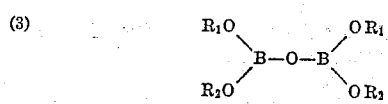

wherein $R_1$ and $R_2$ are as defined above.

(4) 

wherein $R_1$, $R_2$ and $R_3$ are as described above.

(5) 

wherein $R_3$ and $R_4$ are as described above.

The preparation of the orthoborates—(1) above—is described, for example, in U.S. Patent 2,088,935. U.S. Patent 2,613,219 shows the general preparation of metaborates and pyroborates—types (2) and (3) above, respectively. The boronates and borinates (types 4 and 5 above) are prepared as shown in U.S. Patents 2,720,449 and 2,720,448, respectively.

Typical dinuclear phenolic compounds used in the practice of this invention include such compounds as
3,3'-diisopropyl-4,4'-dihydroxydiphenyl;
3,3'-di-(2-decyl)-4,4'-dihydroxydiphenyl;
3,3'-di-tert-butyl-5,5'-dimethyl-4,4'-dihydroxydiphenyl;
3-isopropyl-4,4'-dihydroxydiphenyl;
3-tert-butyl-3',5,5'-triethyl-4,4'-di-hydroxydiphenyl;
4,4'-diisopropyl-3,3'-dihydroxydiphenyl;
4,4'-di-tert-butyl-3,3'-dihydroxydiphenyl;
3,3',5,5'-tetraisopropyl-2,2'-dihydroxydiphenyl;
1,1-bis-(3-isopropyl-4-hydroxyphenyl) methane;
1,1-bis-(3-tert-butyl-4-hydroxyphenyl) methane;
1,1-bis-(3-(2-hexyl)-4-hydroxyphenyl) propylmethane;
1,1-bis-(3-tert-butyl-4-hydroxyphenyl) phenylmethane;
1,1-bis-(3-isopropyl-2-hydroxyphenyl) methane;
1,1-bis-(3-tert-butyl-2-hydroxyphenyl) cyclohexylmethane;
1,1-bis-(3-tert-butyl-5-methyl-4-hydroxyphenyl) methane;
1,1-bis-(3 - tert-butyl-5-ethyl-4-hydroxyphenyl) dimethylmethane;
3,3',5,5'-tetraisopropyl-4,4'-dihydroxydiphenyl;
3,3',5,5' - tetraisopropyl - 2,2' - dimethyl-4,4'-dihydroxydiphenyl;
3,3'-di-tert-butyl-5,5'-di-isopropyl-4,4'-dihydroxyphenyl;
1,1-bis-(3,5-diisopropyl-4-hydroxyphenyl) methane;
1,1-bis-(3,5-di-sec-butyl-4-hydroxyphenyl) methane;
1,1 - bis - (3,5-diisopropyl-4-hydroxyphenyl) phenylmethane;
3,3',5,5'-tetra-tert-butyl-4,4'-dihydroxydiphenyl;
3,3',5,5' - tetra - tert-butyl-2,2'-dimethyl-4,4'-dihydroxydiphenyl;
1,1 - bis - (3,5-di-tert-butyl-4-hydroxyphenyl) cyclohexylmethane;
4,4'-isopropylidene-di-(2-sec-butylphenol);
4,4'-heptylidene-di-(2,6-diisopropylphenol);
3,3'-di-(1-ethylallyl)-4,4'-dihydroxydiphenyl;
4,4' - (4-cyclohexyl-1-methyl-butylidene)bis-(2-isopropylphenol);
1,4-di-(3-tert-butyl-4-hydroxylphenyl) butane;
1,13-di-(3-isopropyl-2-hydroxyphenyl) tridecane;
1,10-di-(3,5-diisopropyl-4-hydroxyphenyl) octadecane;
1,1-bis-(3,5-di-tert-butyl-4-hydroxyphenyl) butylmethane;
1,1-bis-(3,5-di-tert-butyl-4-hydroxyphenyl) phenylmethane;
and the like.

The more important types of dinuclear phenolic compounds used in this invention are described by the following formulas:

(a) 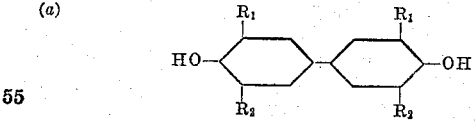

wherein $R_1$ is selected from the group consisting of secondary alkyl radicals containing from 3 to 12 carbon atoms, tertiary alkyl radicals containing from 4 to 12 carbon atoms, cycloalkyl radicals containing from 5 to 12 carbon atoms, and aralkyl radicals containing from 8 to 12 carbon atoms, the alkyl portion of which is branched at the point of attachment to the phenolic nucleus; and $R_2$ is selected from the group consisting of hydrogen, alkyl, cycloalkyl, aralkyl, aryl and alkaryl, $R_2$ (when not hydrogen) preferably containing no more than about 12 carbon atoms.

(b) 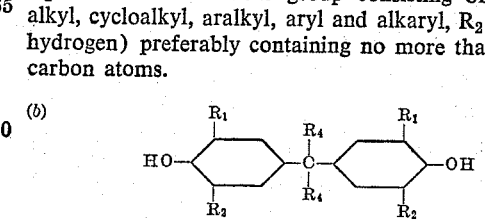

wherein $R_1$ and $R_2$ are as defined above and $R_4$ is alkyl, cycloalkyl, aralkyl, aryl or alkaryl preferably containing no more than 8 carbon atoms.

(c)

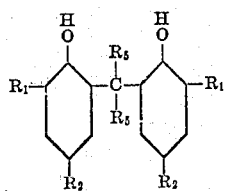

wherein $R_1$ and $R_2$ are as described above and $R_5$ is hydrogen, alkyl, cycloalkyl, aralkyl, aryl or alkaryl, these last-named hydrocarbon radicals containing preferably no more than about 8 carbon atoms.

(d)

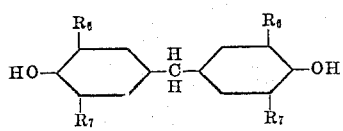

wherein $R_6$ and $R_7$ are secondary alkyl radicals containing from 3 to 8 carbon atoms or tertiary alkyl radicals containing from 4 to 8 carbon atoms.

The compounds of type (a) above can be prepared according to the procedure described in U.S. Patent 2,479,948. The preparation of the compounds of type (b) above is described in U.S. Patent, 2,734,088. The preparation of the compounds of type (c) is described in U.S. Patents 2,515,906 and 2,734,088. The preparation of the compounds of type (d) is described in U.S. patent application, Serial No. 536,317, filed September 23, 1955, now U.S. Patent No. 2,807,653.

Typical boron-containing products of this invention include the product obtained by reacting at 80° C. 0.3 mole of 3,3'-di-cyclohexyl-4,4'-dihydroxydiphenyl per gram atom of boron as methyl metaborate; the product obtained by reacting at 110° C. in toluene 0.5 mole of 1,1-bis-(3-tert-butyl-4-hydroxyphenyl) methane per gram atom of boron as tri-n-amyl orthoborate; the product obtained by reacting at 110° C. in the presence of toluene 0.75 mole of 1,1-bis-(2-hydroxy-3-isopropylphenyl) cyclohexylmethane per gram atom of boron as propyl dibenzylborinate; the product obtained by reacting at 170° C. in the presence of pseudocumene 1.0 mole of 1,1-bis-(3,5-diisopropyl-4-hydroxyphenyl) methane per gram atom of boron as dihexyl butylboronate; the product obtained by reacting at 160° C. 1.2 moles of 4-(2-hexyl)-3,3'-dihydroxydiphenyl per gram atom of boron as tetra-sec-butyl pyroborate; the product obtained by reacting at 80° C. 1.5 moles of 2,15-di(4-isopropyl-3-hydroxyphenyl) hexadecane per gram atom of boron as methyl polyborate; the product obtained by reacting at 160° C. 1.8 moles of 2,2-bis-(2-hydroxy-3-tert-butyl-4-methoxyphenyl) butane per gram atom of boron as isobutyl metaborate; the product obtained by reacting at 110° C. in the presence of toluene, 2.0 moles of 1,1-bis-(3,5-di-tert-butyl-4-hydroxyphenyl) methane per gram atom of boron as tri-n-butyl orthoborate; the product obtained by reacting at 160° C. 2.2 moles of 1,1 - bis - (3,5 - di-tert-butyl-4-hydroxyphenyl) phenylmethane per gram atom of boron as cyclohexyl diethyl orthoborate; the product obtained by reacting at 110° C. in toluene 2.5 moles of 3,3',5,5'-tetraisopropyl-4,4'-dihydroxydiphenyl per gram atom of boron as isopropyl metaborate; the product obtained by reacting at 100° C. 2.8 moles of 4,4'-isopropylidene-di(2-isopropyl phenol) per gram atom of boron as tetraethyl pyroborate; the product obtained by reacting at 110° C. 3.0 moles of 1,1-bis-(3,5-di-tert-butyl-4-hydroxyphenyl) methane per gram atom of boron as triisopropyl orthoborate, and the like.

We claim:
1. The boron-containing product obtained by reaction between (1) a dinuclear phenolic compound having the formula

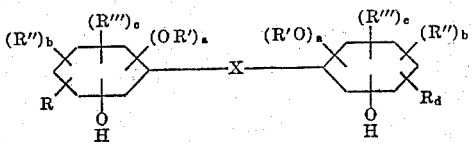

wherein R is selected from the group consisting of secondary alkyl radicals containing from 3 to 12 carbon atoms, tertiary alkyl radicals containing from 4 to 12 carbon atoms, cycloalkyl radicals containing from 5 to 12 carbon atoms and aralkyl radicals branched at the point of attachment to the phenolic nucleus and containing 8 to 12 carbon atoms; R' is selected from the group consisting of hydrogen and alkyl radicals containing from 1 to 8 carbon atoms; R" and R''' are selected from the group consisting of alkyl, cycloalkyl, phenylalkyl, phenyl and alkylphenyl, R" and R''' each containing up to about 18 carbon atoms; X is selected from the group consisting of a single chemical bond directly connecting the phenolic nuclei and a divalent hydrocarbon radical containing from 1 to 34 carbon atoms, and a, b, c, and d are integers from 0 to 1; R being positioned on the phenolic nucleus ortho to the hydroxyl group and (2) a completely esterified symmetrical oxy acid of boron whose esterifying radicals are derived from a monohydric alcohol, each ester group of said esterified oxy acid being discrete, each of said groups being a monovalent hydrocarbon ester group which contains no more than about 6 carbon atoms, said monovalent group being selected from the class consisting of alkyl groups and cycloalkyl groups; there being from about 0.3 to about 3 moles of said compound per gram atom of boron as said completely esterified oxy acid of boron, said esterified acid containing a total of up to 18 carbon atoms.

2. The product of claim 1 wherein said compound is a symmetrical dinuclear phenolic compound.

3. The boron-containing product obtained by heating from about 0.3 to about 3 moles of 1,1-bis-(3,5-di-tert-butyl-4-hydroxyphenyl) methane per gram atom of boron as isopropyl metaborate trimer to a temperature at which isopropanol is evolved.

4. Process of preparing boron-containing products which comprises reacting (1) a dinuclear phenolic compound having the formula

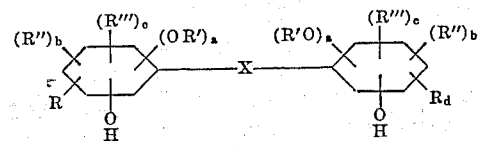

wherein R is selected from the group consisting of secondary alkyl radicals containing from 3 to 12 carbon atoms, tertiary alkyl radicals containing from 4 to 12 carbon atoms, cycloalkyl radicals containing from 5 to 12 carbon atoms and aralkyl radicals branched at the point of attachment to the phenolic nucleus and containing 8 to 12 carbon atoms; R' is selected from the group consisting of hydrogen and alkyl radicals containing from 1 to 8 carbon atoms; R" and R''' are selected from the group consisting of alkyl, cycloalkyl, phenylalkyl, phenyl and alkylphenyl, R" and R''' each containing up to about 18 carbon atoms; X is selected from the group consisting of a single chemical bond directly connecting the phenolic nuclei and a divalent hydrocarbon radical containing from 1 to 34 carbon atoms, and a, b, c, and d are integers from 0 to 1; R being positioned on the phenolic nucleus ortho to the hydroxyl group and (2) a completely esterified symmetrical oxy acid of boron whose esterifying radicals are derived from a monohydric alcohol, each ester group of said esterified oxy acid being discrete, each of said groups being a monovalent, hydrocarbon ester group which contains no more than about 6 carbon atoms, said monovalent group being selected from the class consisting of alkyl groups and cycloalkyl groups; there being used in this reaction from about 0.3 to about 3 moles of said compound per gram atom of boron as said completely esterified oxy acid of boron, said esterified acid containing a total of up to 18 carbon atoms.

References Cited in the file of this patent

UNITED STATES PATENTS

| | | |
|---|---|---|
| 2,053,474 | Graves et al. | Sept. 8, 1936 |
| 2,154,098 | Loane et al. | Apr. 11, 1939 |
| 2,300,006 | Prescott et al. | Oct. 27, 1942 |
| 2,333,871 | Lincoln et al. | Nov. 9, 1943 |